(No Model.)

S. T. WILLIAMS.
RAILWAY BRAKE.

No. 584,028.

Patented June 8, 1897.

Witnesses:
D. W. Gardner.
Charles Peters

Inventor:
Samuel T. Williams
By Webb & Myers,
His Attys.

United States Patent Office.

SAMUEL T. WILLIAMS, OF PLAINFIELD, NEW JERSEY, ASSIGNOR OF ONE-HALF TO GERSHOM RUSLING, OF PASSAIC, NEW JERSEY.

RAILWAY-BRAKE.

SPECIFICATION forming part of Letters Patent No. 584,028, dated June 8, 1897.

Application filed May 23, 1895. Serial No. 550,317. (No model.)

*To all whom it may concern:*

Be it known that I, SAMUEL T. WILLIAMS, a citizen of the United States, and a resident of Plainfield, in the county of Union and State of New Jersey, have invented certain new and useful Improvements in Railway-Brakes, of which the following is a specification.

My invention relates to certain new and useful improvements in railway-brakes, and is more especially adapted for use upon cable-cars, electric cars, and the like.

The invention is adapted for both automatic and ordinary use; and it consists, essentially, in what may be termed a "double brake," one member of which is adapted to brake the wheels of the car in the ordinary manner and the second member of which is adapted to frictionally engage the tracks upon which the car is moving. I arrange these two members in such a manner that when the brakes are operated by means of the ordinary brake-handles the first member may be applied either separately or in conjunction with the second member. When, however, the brakes are applied automatically, as hereinafter described, the two members will be applied simultaneously. The brake is adapted to be used automatically when the car meets an obstruction upon the tracks—such, for instance, as a person, vehicle, or the like.

To these ends my said invention consists in the details of construction and the combination and arrangement of parts, all as more particularly described, and pointed out in the claims.

Figure 1:
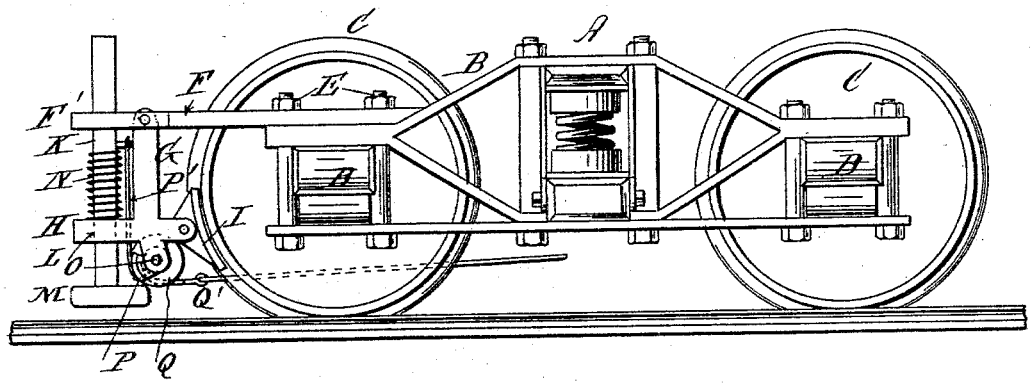
Figure 2:
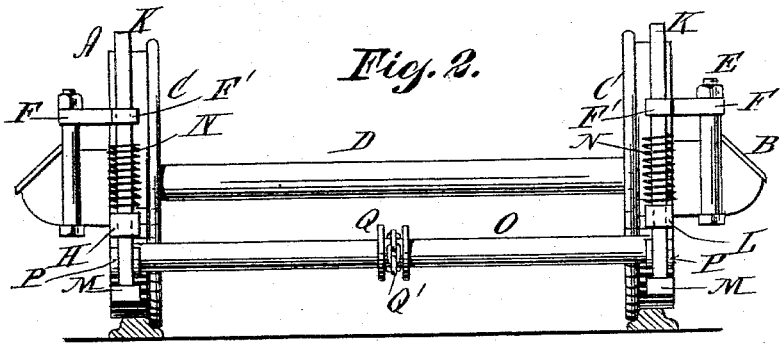
Figure 3:
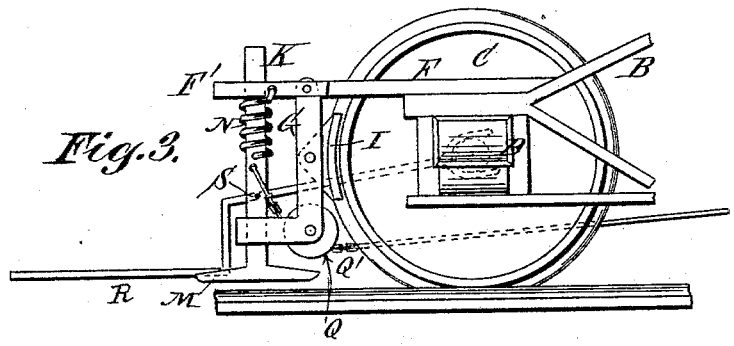

In the drawings accompanying this specification and forming a part thereof, in which like parts are similarly designated, Figure 1 is a side view of one of the trucks of a cable or electric car having my improved brake applied thereto. Fig. 2 is an end view thereof. Fig. 3 is a side view showing my device adapted for both automatic and ordinary application.

Referring to Figs. 1 and 2 of the drawings, A is the truck of a surface car of the ordinary construction, having the frame B, wheels C, and journals D secured to the truck by means of bolts E, passing through the frame B of the truck A. All these parts are of the usual construction and form no part of my invention. At one end of the truck, preferably the front, I secure on either side the arms F F, which extend in a direct line beyond the tires of the wheels and then inwardly and toward each other, so that the portion F' will be in a direct line with the tires of the wheels. These two arms F F constitute the framework for supporting the brake mechanism and are attached to the truck by the ordinary bolts E. By this means my device can be easily attached to or detached from cars already in use. Near the ends of arms F F, I pivot the depending arms G G, which are provided near their lower ends with the cross-arms H H, the inner portions of which carry the ordinary brake-shoes I I, adapted to impinge against the peripheries of the wheels of the car. The outer ends of cross-arms H H and arms F F are coincidently slotted at L L to receive the vertically-sliding bars K K, which carry at their lower ends what I term the "track-brakes" M M. These sliding bars K K fit loosely into the slots L L in order to allow a slight horizontal as well as vertical movement and are normally held above the tracks by means of the springs N N. The lower portion of the depending arms G G form the bearings for a rotatable rod O, said rod being provided on either end with cam-wheels P P. These cam-wheels P P are connected by a chain or flexible band P' to the upper portions of sliding bars K K, so that when the rod O is rotated the cams P P, acting in conjunction with the chain or flexible band P', will cause the downward movement of sliding bars K K to impinge against the tracks. In order to effect the rotation of the rod O, I arrange a guide-wheel Q in the center thereof and attach a chain Q' thereto, said chain leading to the brake-handle for operating the brakes. When the brakes are not in use, this chain Q' will be wound about the guide-wheel Q for nearly a full turn, and when it is desired to stop the car the brake-handle is turned in the usual manner, partially unwinding the chain Q', thereby rotating rod O and impinging the track-brakes against the tracks. Before this action takes place, however, the ordinary brake-shoes I I, mounted on depending arms G G, will be forced against the peripheries of the wheels, thereby braking the car in the usual manner. In common practice this force will be sufficient to stop the car within the distance ordinarily required, but in case of accident or an obstruction on the track the brake-handle need only be still farther turned to bring into operation not only the ordinary brakes, but also the track-brakes, thus stopping the car in a much shorter distance.

Referring to Fig. 3, in which is shown the automatic feature of my invention, I prefer to use a guard or fender of the shape shown therein. I do not limit myself to a guard of this particular construction, however, as it is obvious that guards of other shapes than that shown may be used with the same effect. That shown, however, consists of two side arms R, one at either side, and is provided with suitable cross-bars (not shown) between the two to give it the necessary rigidity. The inner ends of these bars are forked, as shown in the dotted lines in said figure, and rest upon the front axle of the truck, and they are also pivoted, as shown at S, to the sliding bars K K. It is obvious that when a person or vehicle is struck by the fender the weight or shock will cause the track-brakes M M to descend and impinge against the tracks, and at the same time the impetus of the moving car will cause the ordinary brake-shoes to impinge against the wheels, thus diminishing the speed of the car or stopping it entirely. In this construction I prefer to secure the ordinary brake-shoes I I at the point on the depending rods G G upon a horizontal line with the axle of the wheels, thus removing any tendency to lift the car upon encountering an obstruction. I also prefer in this construction to do away with the cams P P of the rotatable rod O and arrange guide-wheels at either end of said rod, over which the brake-chains pass directly to the sliding bars K K. Upon the release of the tension on the brake-chain Q' the wheel-brakes will disengage from the wheels by their own weight and the track-brakes will be withdrawn from contact with the track by means of their springs.

It will be seen that by my invention I produce a brake which possesses a greater efficiency in stopping a moving car and which will act automatically upon the car meeting with an obstruction such as a vehicle, person, &c. It is also obvious that the ordinary brakes may be used separately, as in the usual practice, and that in an emergency both brakes may be put in operation by a simple additional turning of the brake-handles.

Having thus described my invention, what I claim as new, and desire to secure by Letters Patent, is—

1. In a double brake for railway-cars, the combination of two L-shaped depending rods carrying between them rollers, two vertical sliding rods carrying at their lower ends brake-shoes adapted to impinge against the tracks; wheel-brakes mounted upon said L-shaped rods and chains leading to the operating mechanism, attached to the said vertical sliding rods and passing underneath said roller, substantially as described.

2. The combination in an automatic double brake for railway-cars of depending arms carrying wheel-brakes; vertical sliding arms carrying track-brakes, and a fender movably attached to the car, and fitted to the vertical rods, substantially as described.

3. The combination with a track-brake and a wheel-brake of a fender having a frame the inner end of which is provided with forks adapted to fit over the car-axle, said fender being attached to the braking mechanism and adapted to operate the brakes, when the car encounters an obstruction, substantially as described.

4. A double brake for railway-cars consisting of horizontal arms on either side of the car, said arms being bolted at one end to the truck of the car and provided at the other end with a vertical slot; depending arms pivoted to the horizontal arms and carrying brake-shoes adapted to impinge against the periphery of the wheels; vertical sliding bars carrying at their lower ends brake-shoes adapted to impinge upon the tracks; in combination with means for applying the wheel-brakes either alone or in conjunction with the track-brakes, substantially as described.

5. A double brake for railway-cars consisting of horizontal arms on either side of the car, said arms being bolted at one end to the truck of the car and provided at the other end with a vertical slot; depending arms pivoted to the horizontal arms each provided with a cross-bar, one end of which carries the brake-shoe for braking the wheels, and the other end of which is provided with a vertical slot coincident with the slot in the horizontal bar, and bars adapted to slide vertically in the coincident slots aforesaid, being normally kept out of contact with the tracks by means of a spring; and a horizontal rotatable shaft having bearing in the depending arms and provided at either end with a cam-wheel, flexible bands or chains connecting said cam-wheels with the vertical sliding bars carrying the track-brakes and a chain attached at one end to the middle of said rotatable bar and at the other end to the brake-rod whereby the rotatable bar may be rotated by the brake-handle to apply the brakes, substantially as and for the purposes set forth.

6. An automatic double brake for railway-cars consisting of a horizontal arm; an arm carrying the wheel-brake depending therefrom, a vertical sliding rod carrying the track-brake and loosely connected with said depending arm in combination with a fender or guard attached to the vertical sliding arm capable of both a slight vertical and horizontal movement whereby when an obstruction is encountered by the car the weight or shock upon the fender or guard will cause the two brakes to operate to stop the car, substantially as described.

Signed at New York, in the county of New York and State of New York, this 15th day of May, A. D. 1895.

SAMUEL T. WILLIAMS.

Witnesses:
 EUGENE V. MYERS,
 CHARLES C. PETERS.